(12) United States Patent
Garrison

(10) Patent No.: US 6,704,788 B1
(45) Date of Patent: Mar. 9, 2004

(54) METHOD AND APPARATUS FOR TRANSMITTING AND REASSEMBLING PACKETIZED DATA IN LARGE SCALE NETWORKS

(75) Inventor: William John Garrison, Warminster, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/348,076

(22) Filed: Jul. 6, 1999

(51) Int. Cl.[7] ............................... G06F 15/16
(52) U.S. Cl. .................. 709/230; 709/231; 709/235; 709/237
(58) Field of Search ................ 709/230, 231, 709/235, 237, 245, 217

(56) References Cited

U.S. PATENT DOCUMENTS

| | | | | |
|---|---|---|---|---|
| 5,303,302 A | * | 4/1994 | Burrows | 713/161 |
| 5,841,990 A | * | 11/1998 | Picazo, Jr. et al. | 709/239 |
| 6,115,747 A | * | 9/2000 | Billings et al. | 709/231 |
| 6,167,045 A | * | 12/2000 | Pirovano et al. | 370/389 |
| 6,243,739 B1 | * | 6/2001 | Schwartz et al. | 709/206 |

* cited by examiner

*Primary Examiner*—Frantz B Jean
(74) *Attorney, Agent, or Firm*—Steven L. Nichols; Ronald P. Kananen; Rader, Fishman & Grauer PLLC

(57) ABSTRACT

A method and apparatus for transmitting packetized data objects in a system prone to the loss of individual data cells during transmission reduces the number of times a group of data cells must be re-transmitted. Failed attempts to transmit data cell groups upstream are buffered and individual, successfully transmitted cells are identified. After each failed transmission, all subsequent transmissions are reviewed to determine if, using all the failed transmissions together, a single complete data cell set can be obtained and the data object reassembled. Consequently, the data object is completely received and reassembled more quickly than if a single complete transmission of all cells in the group is required.

19 Claims, 2 Drawing Sheets

METHOD AND APPARATUS FOR TRANSMITTING AND REASSEMBLING PACKETIZED DATA IN LARGE SCALE NETWORKS

FIELD OF THE INVENTION

The present invention relates to the field of transmitting large data objects in discrete packets or cells over a large scale network such as a cable television network, local area network (LAN) or wide area network (WAN). More particularly, the present invention relates to the field of reassembling a data object based on the reception of packets or cells of the object's data from two or more failed attempts to transmit the entire packet set.

BACKGROUND OF THE INVENTION

Blocks of data are routinely sent over large-scale networks between computer equipment at separate locations. Examples of such large-scale networks include the internet, local area networks (LANs) or intranets, wide area networks (WANs) and cable television systems.

The data transmitted between computer equipment in separate locations may be any type of messaging required between the component computers of the system. For example, the data being transmitted may be a request for data or an instruction from one computer to another. Additionally, transmitted data might include input for (or output from) a running application or application programming itself.

The computer originating the transmission may be, for example, a server or a networked personal computer. In a cable television system, data transmission is between a signal head-end and a population of set-top terminals. The signal head-end is the facility from which the service provider broadcasts the cable television signal and controls the cable network. Each subscriber has a set-top terminal which is a box of computer equipment for connecting the subscriber's television set to the cable network.

In order to facilitate the transmission of large blocks of data, the data block is broken down into a series of packets or cells. The cells are then sent individually over the network and received and reassembled by the receiving computer into the original data object. An illustration of this process is provided in FIG. 1.

FIG. 1 illustrates an exemplary cable television system in which a signal head-end (103) is connected via a cable network (105) with a population of set-top terminals (104). Each of the set-top terminals (104) is located at the location of a subscriber to the cable service and connects the subscriber's television set to the cable network (105).

Under normal operating circumstances, the head-end (103) continually provides television programming and other data over the cable network (105) to the set-top terminals (104). Occasionally, however, it is necessary for the set-top terminals (104) to transmit data to the head-end (103). As shown in FIG. 1, one of the set-top terminals (104A) possesses a data object (101) which is to be transmitted to the head-end (103). The data object (101) may be, for example, a order for pay-per-view or video-on-demand programming.

In order to transmit the data object (101) to signal head-end (103), the head-end (103) divides the data object (101) into a series of cells (102). The cells are then individually transmitted over the cable network (105) to the head-end (103).

However, due to the heavy downstream transmission of data from the head-end (103) to the terminals (104) that accompanies normal operation of the cable system, it can be difficult for the terminal (104) to transmit a message upstream to the head-end (103). The transmission of any particular cell may collide with data being sent from the head-end (103). Therefore, it is very possible that not all the cells will be transmitted accurately and completely to the head-end (103).

Moreover, any number of terminals in the population of terminals (104) may be communicating with the head-end (103) over the network (105). This network congestion may further result in the complete or partial loss of one or more of the data cells (102) as received by the head-end (103).

Following receipt of a transmission from a terminal (104), the head-end (103) will determine whether it has received an incomplete set of cells (102). If the data from the terminal (104) was not received in its entirety, the head-end (103) will simply signal the terminal (104) to repeat the transmission.

In response to such a request from the head-end (103), the terminal (104) will retransmit all the data cells (102) for the object (101). This process repeats until the head-end (103) receives all the data cells (102) properly and can reassemble the data object (101) therefrom.

Consequently, the amount of traffic on the network (105) is self-multiplying. As upstream traffic from the set-top terminals (104) to the head-end (103) increases, the probability that one or more of the cells (102) in a particular transmission will be lost in transit over the network (105) also increases. As a result, the head-end (103) must demand more repeat transmissions from the set-top terminals (104) thereby further burdening the network (105) with increased upstream traffic. The increased upstream traffic, in turn, decreases the probability that any particular transmission will be made completely and accurately, thereby restarting the cycle.

The loss of data cells during upstream transmission can be minimized by, for example, providing a separate signal path from each of the set-top terminals (104) to the head-end (103) to prevent the collision of data moving in both directions. Additionally, more expensive and complicated transmission protocols, excessive bandwidth in the transmission path and top-quality computer equipment can decrease the chance of lost data cells. However, such measures increase drastically the complexity and expense of the system as compared to a less complex system which more frequently suffers from a lost data cell.

Therefore, there is a need in the art for an improved method and apparatus for transmitting a data object which has been broken into a set of data cells upstream over a computer network, particularly from a cable television system set-top terminal to a head-end facility without unduly increasing the cost of the system.

SUMMARY OF THE INVENTION

It is an object of the present invention to meet the above-described needs and others. Specifically, it is an object of the present invention to provide an improved method and apparatus for transmitting a data object which has been broken into a set of data cells over a computer network which is prone to losing occasional data cells during transmission.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a system including networked units of computer equipment located at different locations in which at least one unit of the computer equipment transmits a data object divided into a group of data cells to another unit of the computer equipment over a network under conditions prone to loss or unsuccessful transmission of one or more of the data cells. The system includes a first computer or unit of computer equipment including a memory unit; and a second computer or unit of computer equipment transmitting the group of data cells over a network to the first unit of computer equipment. In a preferred embodiment, the first unit of computer equipment is a head-end facility in a cable television system, and the second unit of computer equipment is a set-top terminal in the cable television system.

The first unit of computer equipment stores data cells received from the second unit of computer equipment in the memory for later reference regardless of whether the group of data cells is completely received in a particular transmission. After each transmission from the second unit of computer equipment, the first unit of computer equipment will determine if, between the most recently received transmission and previous transmissions from the second unit of computer equipment which are stored in the memory, all data cells of the group of data cells have been received.

If all data cells of the group of data cells have been received, the first unit of computer equipment will reassemble the data object by collecting the necessary data cells from the various failed transmissions that have been received and stored. If all data cells of the group of data cells have not been received, the first unit of computer equipment will signal the second unit of computer equipment to retransmit the group of data cells to the first unit of computer equipment over the network.

The system of the present invention may also include a timer in the first unit of computer equipment. If a predetermined period of time has elapsed during which the second unit of computer equipment has tried unsuccessfully to transmit all of the data cells of the group of data cells to the first unit of computer equipment, the first unit of computer equipment will not signal the second unit of computer equipment for a retransmission of the data cells.

The present invention also encompasses the method used by the system described above. In other words, the present invention includes a method for transmitting a data object between separately located, networked units of computer equipment in which a first unit of the computer equipment transmits the data object divided into a group of data cells to a second unit of the computer equipment over a network under conditions prone to loss or unsuccessful transmission of one or more of the data cells.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
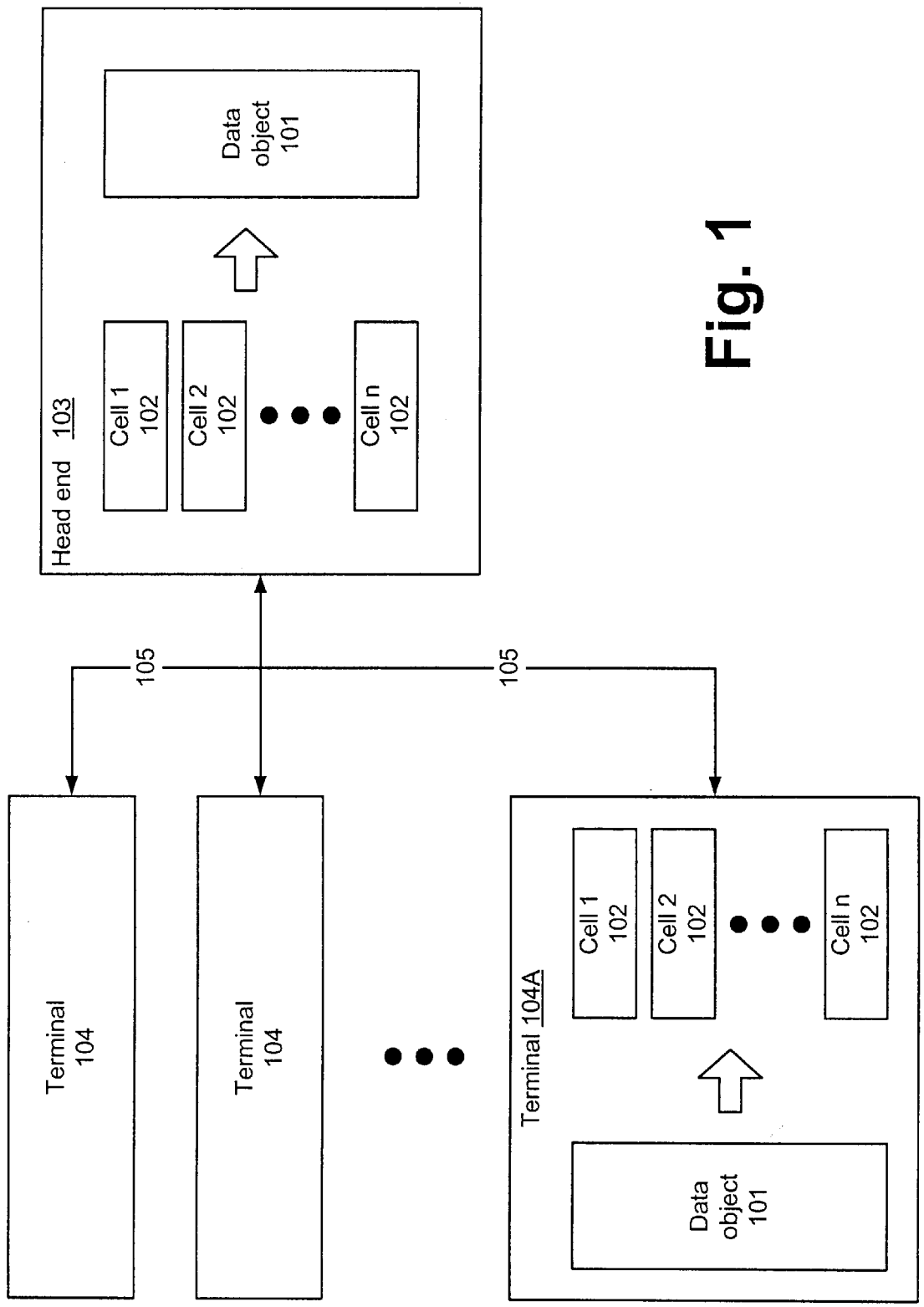
FIG. 1 is a block diagram of computerized network in which the present invention can be implemented.
Figure 2:
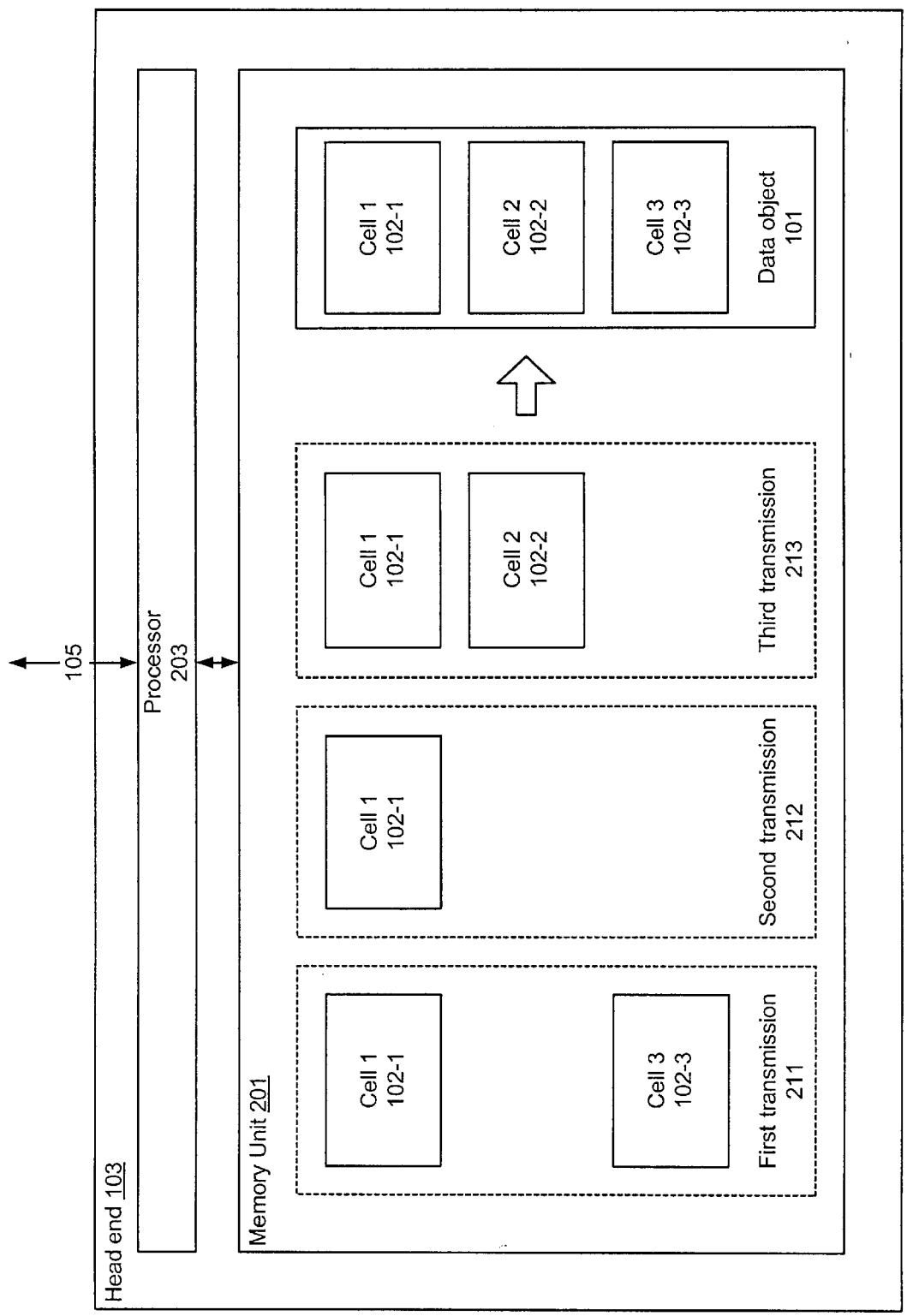
FIG. 2 is a diagram of a set-top terminal in a cable television system constructed and operating according to the principles of the present invention.

FIG. 2 illustrates a head-end facility (103) in a cable television system constructed and operating according to the principles of the present invention. As shown in FIG. 2, the head-end (103) is connected to a cable television network (105) over which the head-end (103) provides cable television programming to cable subscribers who possess the set-top terminals (104). The head-end (103) also provides instructions and other data services to the population of set-top terminals (104), such as an electronic programming guide or new application programming. Each set-top terminal (104) is connected between the cable network (105) and a subscriber's television set (not shown).

The head-end (103) also receives communications from the set-top terminals (104). For example, the terminal (104A) may send a purchase request for a pay-per-view event or video-on-demand to the head-end (103) over the network (105). Other examples of necessary or useful signaling from the set-top terminals (104) to the head-end (103) will be apparent to those skilled in the art.

Generally speaking, the head-end (103) includes a central processor (203) and a memory unit (201). The processor (203) executes programming, provides data services to the set-top terminals (104) and receives transmissions from the set-top terminals (104) over the network (105). Data received or needed by the processor (203) is stored in the memory unit (201).

FIG. 2 illustrates an example in which three successive attempts have been made unsuccessfully by a particular set-top terminal (104A) to transmit a group of three data cells (102) to the head-end (103). In each attempt, some, but not all, of the three data cells have been received by the head-end (103). Each of these attempts is buffered in the memory unit (201).

In the first attempt (211), the head-end (103) successfully received only the first (102-1) and third (102-3) of the three cells. Under the principles of the present invention each cell (102) contains a header which uniquely identifies the data object (101) to which the cell (102) pertains and which uniquely identifies the cell with the group of cells for that object (101). For example, each cell (102-n) in the group is numbered in sequence so that the cells can be readily accounted for and reassembled into the data object (101). The last cell in the group is also so identified.

As illustrated in FIG. 2, at the end of the first transmission (211), cell 3 (102-3) is received and is identified as the last cell in the group. The processor (203) of the head-end (103) can then determine that it has received only the first (102-1) and third (102-3) cells in a three cell group during the first transmission (211). These two cells (102-1 and 102-3) are buffered in the memory unit (201).

The head-end (103) then signals the transmitting set-top terminal (104A) that the transmission was incomplete. Consequently, the set-top terminal (104A) again transmits the three cells in the group of the data object (101). Traffic on the network (105) is worse during the second transmission (212) and only one of the three cells (102-1) is received.

The head-end (103) again assesses the completeness of the transmission and finds that only the first cell (102-1) of the three was received. However, rather than immediately requesting a third attempted transmission from the set-top terminal (104A), the head-end (103) will determine if, between the cells successfully received in both the first and second transmissions (211 and 212), a complete data object (101) can be constructed. If so, the reassembly of the data object (101) is performed without the need to request a third transmission of the object (101) from the set-top terminal (104A).

In the example illustrated in FIG. 2, after the second transmission, cell 2 (102-2) has still not been received by the head-end (103) in either of the first or second transmissions (211 and 212). Consequently, the head-end (103) signals the set-top terminal (104A) for a third transmission (213) of the cells (102) for data object (101).

The set-top terminal (104A) then makes the third transmission (213) to the head-end (103) in which two of the three cells are received (102-1, 102-2). This third transmission (213) contains a cell 2 (102-2). Therefore, between the three transmissions, the head-end (103) has obtained all three cells and can reassemble the data object (101) even though none of the three transmissions were entirely successful in providing all three data cells (102) to the head-end (103).

In contrast, under previous systems, the first and second transmissions are not buffered in memory for later reference. Upon receiving the third transmission, a head-end in a conventional system would find the third transmission (213) incomplete, i.e., lacking cell 3, and request a fourth transmission from the set-top terminal (104A) in a further attempt to receive all three cells in a single upstream transmission.

The processor (203) may also include a timer that records the amount of time the head-end (103) has been attempting to assemble all the cells of a particular transmission from the set-top terminal (104A). In the event this timer exceeds a predetermined threshold or time-out point, the head-end (103) may conclude that the data object (101) cannot be transmitted at the present time. The head-end (103) may then return to other tasks that were being deferred and may, as needed, purge unsuccessful buffered attempts at receiving the data set (211, 212, etc.) from the memory unit (201).

Alternatively, it is within the scope of the present invention for the head-end to identify which cells have not been properly received and signal the identity of those cells to the set-top terminal in the request for a subsequent transmission. The set-top terminal, rather than re-transmitting the entire cell group, can then re-transmit only those cells still needed by the head-end. This process continues until all the cells are properly received by the head-end and the data object can be reassembled. This variation requires additional sophistication and programming at the head-end and set-top terminal, but can further decrease the upstream data traffic on the network.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system including networked units of computer equipment located at different locations in which at least one unit of said computer equipment transmits a data object divided into a group of data cells to another unit of said computer equipment over a network under conditions prone to loss or unsuccessful transmission of one or more of said data cells, the system comprising:

a first unit of computer equipment including a memory unit; and a second unit of computer equipment transmitting said group of data cells over a network to said first unit of computer equipment;

wherein said first unit of computer equipment stores data cells received in said memory for later reference regardless of whether said group of data cells is completely received in a particular transmission; and wherein as soon as all data cells for said object are received by said first unit of computer equipment, said object is assembled for use by said first unit of computer equipment.

2. The system of claim 1, wherein after each transmission from said second unit of computer equipment, said first unit of computer equipment will determine if, among a most recently received transmission and previous transmissions from said second unit of computer equipment stored in said memory, all data cells of said group of data cells have been received.

3. The system of claim 2, wherein, if all data cells of said group of data cells have been received, said first unit of computer equipment will reassemble said data object therefrom.

4. The system of claim 2, wherein, if all data cells of said group of data cells have not been received, said first unit of computer equipment will signal said second unit of computer equipment to retransmit said group of data cells to said first unit of computer equipment over said network.

5. The system of claim 4, further comprising a timer in said first unit of computer equipment, wherein if a predetermined period of time has elapsed in which said second unit of computer equipment has tried unsuccessfully to transmit all of said data cells of said group of data cells to said first unit of computer equipment, said first unit of computer equipment will not signal said second unit of computer equipment for a retransmission of said data cells.

6. The system of claim 2, wherein if all data cells of said group of data cells have not been received, said first unit of computer equipment will signal said second unit of computer equipment to retransmit only those data cells which said first unit of computer equipment has not yet received.

7. The system of claim 1, wherein said first unit of computer equipment is a head-end facility in a cable television system, and said second unit of computer equipment is a set-top terminal in said cable television system.

8. A method for transmitting a data object between separately located, networked units of computer equipment in which a first unit of said computer equipment transmits said data object divided into a group of data cells to a second unit of said computer equipment over a network under conditions prone to loss or unsuccessful transmission of one or more of said data cells, the method comprising:

storing data cells received by said first unit of computer equipment in a memory unit of said first unit of computer equipment for later reference regardless of whether said group of data cells is completely received in a particular transmission from said second unit of computer equipment; and upon receipt of all data cells in said data object by said second unit of computer equipment, assembling said data object for use by said by said second unit of computer equipment.

9. The method of claim 8, further comprising, after each transmission from said second unit of computer equipment, determining if, among a most recently received transmission and previous transmissions from said second unit of computer equipment stored in said memory, all data cells of said group of data cells have been received by said first unit of computer equipment.

10. The method of claim 9, further comprising, if all data cells of said group of data cells have been received, collecting said group of data cells by taking data cells from different transmissions stored in said memory, and reassembling said data object from said collected data cells.

11. The method of claim 9, further comprising, if all data cells of said group of data cells have not been received, signaling said second unit of computer equipment to retransmit said group of data cells to said first unit of computer equipment over said network.

12. The method of claim 9, further comprising, if all data cells of said group of data cells have not been received, signaling said second unit of computer equipment to retransmit only those data cells which said first unit of computer equipment has not yet received.

13. The method of claim 8, wherein said first unit of computer equipment is a head-end facility in a cable television system, and said second unit of computer equipment is a set-top terminal in said cable television system.

14. The method of claim 8, further comprising:

timing a time during which said second unit of computer equipment has tried unsuccessfully to transmit all of said data cells of said group of data cells to said first unit of computer equipment; and comparing said time a predetermined time limit, wherein if said time exceeds said predetermined time limit, said first unit of computer equipment will not signal said second unit of computer equipment for a retransmission of said data cells.

15. A system including networked computing means located at different locations in which at least one unit of said computing means transmits a data object divided into a group of data cells to another unit of said computing means over a network under conditions prone to loss or unsuccessful transmission of one or more of said data cells, the system comprising:

a first computing means including a memory means; and a second computing means for transmitting said group of data cells over a network to said first computing means;

wherein said first computing means stores data cells received in said memory means for later reference regardless of whether said group of data cells is completely received in a particular transmission; and wherein as soon as all data cells for said object are received by said first computing means, said object is assembled for use by said first computing means.

16. The system of claim 15, wherein after each transmission from said second computing means, said first computing means will determine if, among a most recently received transmission and previous transmissions from said second computing means stored in said memory means, all data cells of said group of data cells have been received.

17. The system of claim 16, wherein, if all data cells of said group of data cells have been received, said first computing means will reassemble said data object therefrom.

18. The system of claim 16, wherein, if all data cells of said group of data cells have not been received, said first computing means will signal said second computing means to retransmit said group of data cells to said first computing means over said network.

19. The system of claim 16, wherein, if all data cells of said group of data cells have not been received, said first computing means will signal said second computing means to retransmit those data cells not yet received by said first computing means to said first computing means over said network.

* * * * *